Figures 1, 2:
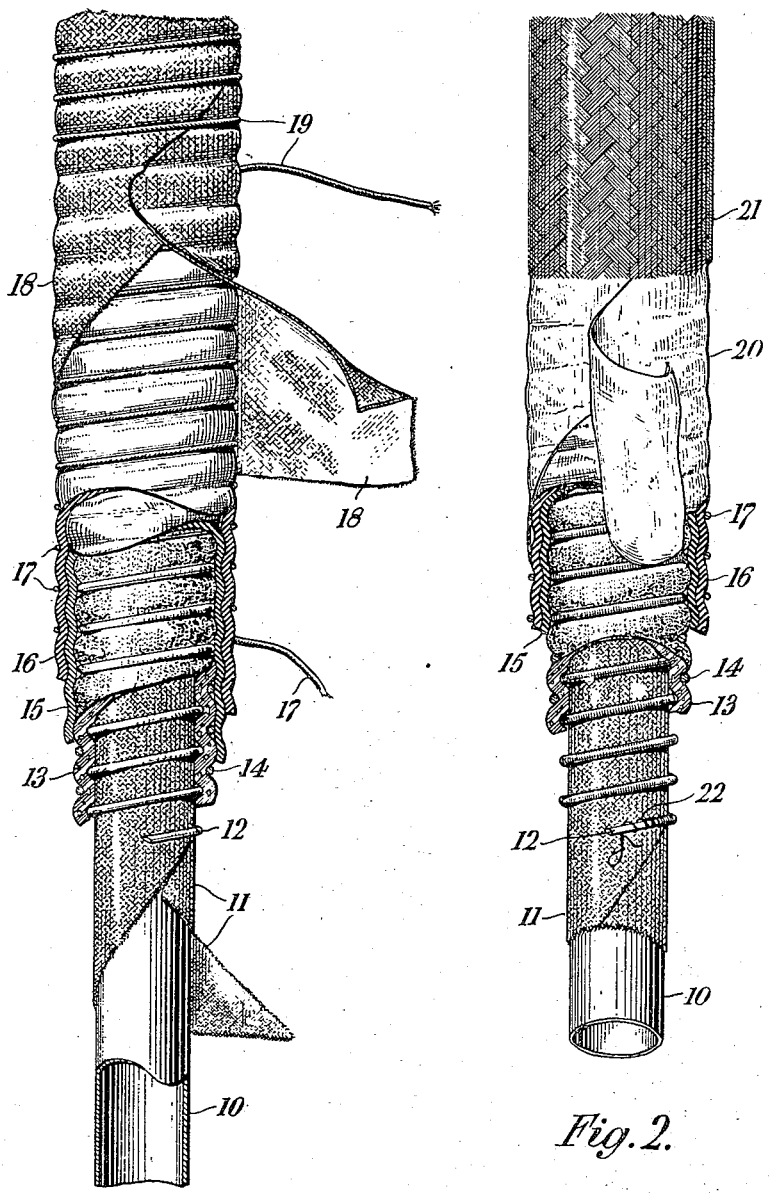

Patented Jan. 12, 1943

2,308,343

UNITED STATES PATENT OFFICE 2,308,343

SELF-SEALING PETROL PIPE

Bernard Wilkinson, London, and George Standen, Hampshire, England; said Wilkinson assignor to Wilkinson Rubber Linatex Limited, London, England Application July 30, 1941, Serial No. 404,726
In Great Britain June 6, 1941

10 Claims. (Cl. 138—55)

In United States application Serial No. 376,204 are described various forms of flexible self-sealing petrol pipes comprising a tubular layer of Linatex or other rubber having the property of swelling when in contact with petrol, a tubular layer of a material impervious to the action of petrol, a helical winding of a rigid stiffening material and an external protective covering, and it is explained that it is advantageous to employ as the stiffening material a non-metallic, non-splintering material, such for example as regenerated cellulose, because such a material will disintegrate if struck by a bullet, whereas a metal helix will shatter into splinters which increase the destructive effect of the bullet. We have now found, however, that there are disadvantages in locating the non-metallic stiffening helix at the inside of the pipe where it is exposed to the action of the petrol, because the non-metallic material is liable to be affected either by petrol or moisture, and consequently tends to lose its rigidity in service.

The present invention provides a flexible self-sealing petrol pipe comprising a core, consisting of an inner tube made of a synthetic resin or synthetic rubber which is impervious to the action of petrol, a surrounding helical stiffening winding of a rigid non-metallic non-splintering material, such for example as regenerated cellulose, polyvinyl resin or vulcanised fibre, a layer of Linatex, or other rubber having the property of swelling when exposed to the action of petrol, which is disposed outside the helical winding and is bonded to the core, and an external protective covering.

With this construction the stiffening winding is protected from the action of the petrol by the inner tube, and consequently the above-described disadvantage is avoided.

It is preferred to make the inner tube of polyvinyl resin, but other petrol-proof synthetic resins or synthetic rubbers may be used for the purpose, for example the material known as thiokol.

It is of considerable advantage to provide corrugations in the body of the pipe to assist in preventing collapse of the pipe on flexure. To this end it is preferred to use two windings of the non-metallic stiffening material, with a layer of sponge rubber or other cushioning material between them, the windings being out of register so as to cause the cushioning material to assume a corrugated form. The surrounding layer or layers of Linatex will then also assume a corrugated form and this tendency can be accentuated by binding the Linatex externally with cord, the cord windings registering with those of the outer non-metallic helix.

Two forms of self-sealing pipe according to the invention will now be described in further detail, by way of example, with reference to Figures 1 and 2 of the accompanying drawing. Each of these figures shows, to full size scale, one of the pipes in elevation, broken away to show the internal structure.

The pipe shown in Figure 1 has a core consisting of an extruded tube 10 of polyvinyl resin ¾" in external diameter and 1 mm. thick. It is built up by placing the core on a mandrel and winding around it a layer 11 of fabric coated on the inside with vinyl cement and on the outside with rubber cement. The fabric is thus firmly bonded to the core. A winding 12 of a non-splintering, non-metallic stiffening material, such as regenerated cellulose, polyvinyl chloride or vulcanised fibre is then applied. Over this is applied a butt-jointed layer 13 of sponge rubber $\frac{1}{16}$" thick and coated on both sides with a suitable cement, for example the rubber solution sold under the registered trade-mark "Solufix" cement. Over this is wound a second winding 14 of the non-metallic stiffening material, the convolutions of the outer helix 14 being out of register with those of the inner helix 12 so that the intervening cushioning layer 13 of sponge rubber assumes a corrugated form, as illustrated.

Next two layers 15, 16 of $\frac{1}{16}$" Linatex are applied. These may consist either of sheets wrapped around the assembly and formed with longitudinal butt-joints staggered relatively to one another, or they may consist of preformed Linatex tubes. "Linatex" is a registered trade-mark and the material is fully described in British Patent No. 437,928. Linatex is a material manufactured directly from rubber latex by incorporating in the latex a vulcanising ingredient, such as sulphur, and an accelerator, coagulating the mixture, separating the coagulum from the residual liquor, preparing crepe or sheet rubber from the coagulum, drying the rubber under conditions such that substantially no vulcanisation takes place, and thereafter effecting very slow vulcanisation of the dry rubber, the period of vulcanisation extending from at least one or two weeks up to several months. The material so obtained is particularly adapted for use in self-sealing flexible fuel pipes because of its high resistance to aging resulting probably from the amorphous structure thereof; because it can be joined with rubber cement without the application of heat; because of its exceptional resilience, resistance to abrasion and tearing. In addition to the above physical properties it is capable of swelling rapidly when in contact with petrol or the like without substantial loss of mechanical strength or solution in the petrol. The Linatex layers are coated on both sides with "Solufix" cement so that they are bonded together and to the layer 13 of sponge rubber.

Around the outer layer 16 of Linatex is applied a winding 17 of hemp cord, the convolutions of which register with those of the outer helix 14. This assists in causing the Linatex layers to assume a corrugated form. An external protective layer of fabric 18 is then wound helically around the pipe with a lap joint and finally an external binding 19 of hemp cord is applied and the exterior of the pipe treated with one or more applications of dope. The mandrel is then removed. In some cases it may be desirable to remove the outer winding 19 of cord before applying the dope.

It will be understood that it is important that all the constituent layers of the pipe should be bonded firmly together and to the core 10. The fabric layer 11 serves to assist in bonding the sponge rubber 13 to the core, but it may be dispensed with particularly if a suitable cement is employed as the adhesive for securing the sponge rubber to the core.

The fabric 11 is illustrated as being wound spirally around the core, but as an alternative we may employ fabric cut on the bias and wrapped on the core with a longitudinal joint. Again the two superposed layers 15, 16 of Linatex may be replaced by a single Linatex tube of ⅛" wall thickness.

The outer envelope 18 may be made of fabric treated with neoprene or of two layers of fabric formed into a sandwich with a layer of vulcanised rubber between them. Although it has been stated that the inner tube 10 of polyvinyl resin is impervious to the action of petrol, it nevertheless allows a very small amount of petrol vapour to seep through it. It is therefore desirable to employ as an outer covering a material which will permit of the escape of this minute proportion of petrol vapour and prevent its accumulation within the body of the pipe.

If desired, in order to obtain a more intimate bond between the layers constituting the pipe, the layer or layers of Linatex or other rubber used in building up the pipe on the mandrel may be uncured or only partially cured, and the cements used for sticking the layers of rubber and fabric together may have a suitable accelerator in them. In this case, after the pipe has been completely constructed, it will be placed in a suitable heater so that the cement in the various joints and the rubber can become fully cured, giving the required intimate bond. The tubular layer of Linatex or other rubber will be made from sheet with a cemented joint, and this treatment will result in a stronger and more satisfactory joint in this layer.

Where this method is adopted, the outer layer 18 of fabric may conveniently be provided with an external coating of fuel-resisting rubber, so that after vulcanisation of the pipe this rubber will give the necessary protection to the exterior of the pipe and obviate the necessity of doping. The outer layer 18 of rubber-coated fabric can be wound helically as illustrated, or joined longitudinally, and in either case the heat of vulcanisation will produce a flow in the outer rubber skin which will completely cover the longitudinal or helical butt-joint in the fabric.

The pipe shown in Figure 2 is of identical construction to that in Figure 1 except that the outer covering, instead of being made of fabric, consists of a layer 20 of the material sold under the registered trade-mark "Cellophane" and an outer layer 21 of woven or braided metal. There is one further difference and that is that the inner helix 12 is covered with a layer 22 of cotton or rubber to assist in bonding it to the fabric 11. It is of course important that relative movement of the inner helix and the core should, so far as is possible, be prevented. The cotton or rubber covering on the inner helix 12 of stiffening material can also be used in the case of the pipe shown in Figure 1.

What we claim as our invention and desire to secure by Letters Patent is:

1. A flexible self-sealing petrol pipe, comprising a core consisting of an inner tube made of a synthetic material impervious to the action of petrol, two superposed helical windings of a rigid, non-metallic, non-splintering material disposed around the core with their convolutions out of register, a layer of a cushioning material disposed between said windings and bonded to the core, a layer of rubber having the property of swelling when exposed to the action of petrol which is disposed outside the outer helical winding and bonded to the cushioning material, and an external protective covering.

2. A flexible self-sealing petrol pipe, comprising a core consisting of an inner tube made of a synthetic material impervious to the action of petrol, two superposed helical windings of a rigid, non-metallic, non-splintering material disposed around the core with their convolutions out of register, a layer of a cushioning material disposed between said windings and bonded to the core, a layer of rubber having the property of swelling when exposed to the action of petrol which is disposed outside the outer helical winding and bonded to the cushioning material, a winding of cord surrounding said rubber layer and with its convolutions registering with those of the outer helical winding aforesaid, and an external protective covering.

3. A flexible self-sealing petrol pipe, comprising a core consisting of an inner tube made of extruded polyvinyl resin, two superposed helical windings of a rigid, non-metallic, non-splintering material disposed around the core with their convolutions out of register, a layer of sponge rubber disposed between said windings and bonded to the core, at least one layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, disposed outside the outer helical winding and bonded to the sponge rubber, a winding of cord surrounding said rubber composition layer and with its convolutions registering with those of the outer helical winding aforesaid, and an external protective covering.

4. A flexible self-sealing petrol pipe, comprising a core consisting of an inner tube made of a synthetic material impervious to the action of petrol, a surrounding helical stiffening winding of a rigid, non-metallic, non-splintering material said helical winding being wrapped with textile material, a layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, which is disposed outside the helical winding and bonded to the core and to said textile material, and an external protective covering.

5. A flexible self-sealing petrol pipe, comprising a core consisting of an inner tube made of a synthetic material impervious to the action of petrol, two superposed helical windings of a rigid non-metallic, non-splintering material disposed around the core with their convolutions out of register, the inner helical winding being wrapped with textile material, a layer of a cushioning material disposed between said windings and bonded to the core and to the textile material, a layer of rubber having the property of swelling when exposed to the action of petrol without losing mechanical strength which is disposed outside the outer helical winding and bonded to the cushioning material, and an external protective covering 6. A flexible self-sealing petrol pipe, comprising a core consisting of an inner tube made of extruded polyvinyl resin, two superposed helical windings of a rigid, non-metallic, non-splintering material surrounding the core with their convolutions out of register, a layer of sponge rubber disposed between said windings and bonded to the core, a layer of a vulcanized rubber composition of amorphous structure and having high tear resistance and mechanical strength in combination with the property of swelling when in contact with petrol without substantial dissolution or loss of mechanical strength, said layer surrounding the outer winding and being bonded to the sponge rubber, and an external protective covering surrounding the said rubber composition and being bonded to it.

7. A flexible, self-sealing petrol pipe, comprising a core consisting of an inner tube made of a flexible synthetic material impervious to the action of petrol, a layer of fabric and means bonding the tube and fabric together; a surrounding helical, stiffening winding of a rigid, non-metallic, non-splintering material; a layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, and which is disposed outside of the winding and means bonding the rubber composition to the core fabric; and an external protective covering.

8. A flexible, self-sealing petrol pipe, comprising a core consisting of an inner tube made of a flexible synthetic material impervious to the action of petrol, a layer of fabric and means bonding the tube and fabric together; a surrounding spaced turn, helical, stiffening winding of a rigid, non-metallic, non-splintering material; a layer of rubber having the property of swelling when exposed to the action of petrol without substantial loss of mechanical strength and which is disposed outside of the winding and means bonding the rubber composition to the core fabric; and an external protective covering.

9. A flexible, self-sealing petrol pipe, comprising a core consisting of an inner tube of flexible polyvinyl resin and a layer of fabric cemented thereto by vinyl cement; a surrounding spaced turn, helical, stiffening winding of a rigid, non-metallic, non-splintering material cemented to said fabric, a layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, and which is disposed outside of said winding, and rubber cement bonding the rubber composition to the said fabric between the turns of said winding.

10. A flexible, self-sealing petrol pipe, comprising a core consisting of an inner tube of flexible synthetic material impervious to the action of petrol and a layer of fabric cemented thereto; a surrounding spaced turn, helical stiffening winding of a rigid, non-metallic, non-splintering material, a layer of a rubber composition, of the class obtainable by the very slow vulcanization of dried crepe rubber formed from the coagulum of a mixture of latex, a vulcanizing ingredient and an accelerator, and having an amorphous structure similar to that of pure rubber, high tear resistance and mechanical strength and the property of swelling when in contact with petrol, while retaining its mechanical strength and resisting dissolving therein, and which is disposed outside of said winding and cemented to said fabric between the turns of said winding; a cord tightly wound over said layer at the same pitch as said winding, and an external protective covering.

BERNARD WILKINSON.
GEORGE STANDEN.